United States Patent
Cohen et al.

(10) Patent No.: US 12,338,105 B2
(45) Date of Patent: *Jun. 24, 2025

(54) METHOD FOR MONITORING LIFTING EVENTS AT A CONSTRUCTION SITE

(71) Applicant: Versatile Natures Ltd., San Francisco, CA (US)

(72) Inventors: Barak Cohen, San Francisco, CA (US); Meirav Oren, San Francisco, CA (US); Danny Hermann, San Francisco, CA (US); Ran Oren, San Francisco, CA (US); Omer Cohen, San Francisco, CA (US)

(73) Assignee: Versatile Natures Ltd., San Francisco, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 18/087,387

(22) Filed: Dec. 22, 2022

(65) Prior Publication Data

US 2023/0130430 A1   Apr. 27, 2023

Related U.S. Application Data

(63) Continuation of application No. 17/184,471, filed on Feb. 24, 2021, now Pat. No. 12,049,387, which is a continuation of application No. 17/033,579, filed on Sep. 25, 2020, now Pat. No. 10,968,084.

(60) Provisional application No. 62/906,703, filed on Sep. 26, 2019.

(51) Int. Cl.
*B66C 13/46*   (2006.01)
*B66C 1/40*    (2006.01)
*B66C 13/16*   (2006.01)
*G01G 19/14*   (2006.01)

(52) U.S. Cl.
CPC ............. *B66C 13/46* (2013.01); *B66C 1/40* (2013.01); *B66C 13/16* (2013.01); *G01G 19/14* (2013.01)

(58) Field of Classification Search
CPC .......... B66C 13/16; B66C 13/46; G01G 19/14
See application file for complete search history.

(56) References Cited

U.S. PATENT DOCUMENTS 10,968,084 B1 *   4/2021   Cohen ................... B66C 1/40
2018/0346294 A1 * 12/2018   Shely ................... B66C 23/905

FOREIGN PATENT DOCUMENTS

KR    2020065595 A1 *  6/2020  ............. B66C 13/16

* cited by examiner

*Primary Examiner* — Timothy R Waggoner
(74) *Attorney, Agent, or Firm* — Run8 Patent Group, LLC; Peter Miller; Alexander Rodriguez

(57) ABSTRACT

One variation of a method for tracking lift events at a construction site includes: accessing a timeseries of load values output by a weight sensor, coupled to a crane hook, and a first geospatial location of the crane hook during a first time period; deriving a lifting profile at the first geospatial location from the timeseries of load values; deriving a weight of the object from the timeseries of load values; identifying a type of the object carried by the crane hook during the first time period based on the lifting profile; accessing a second geospatial location of the crane hook during unloading of the object from the crane hook; and generating a lift event record defining the type of the object, the weight of the object, a pickup location of the object at the first geospatial location, and a drop-off location of the object at the second geospatial location.

20 Claims, 6 Drawing Sheets

METHOD FOR MONITORING LIFTING EVENTS AT A CONSTRUCTION SITE

CROSS-REFERENCE TO RELATED APPLICATIONS

This Application is a continuation application of U.S. patent application Ser. No. 17/184,471, filed on 24 Feb. 2021, which is a continuation application of U.S. patent application Ser. No. 17/033,579, filed on 25 Sep. 2020, which claims the benefit of U.S. Provisional Application No. 62/906,703, filed on 26 Sep. 2019, each of which is incorporated in its entirety by this reference.

TECHNICAL FIELD

This invention relates generally to the field of construction management and more specifically to a new and useful method for monitoring lift events at a construction site in the field of construction management.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
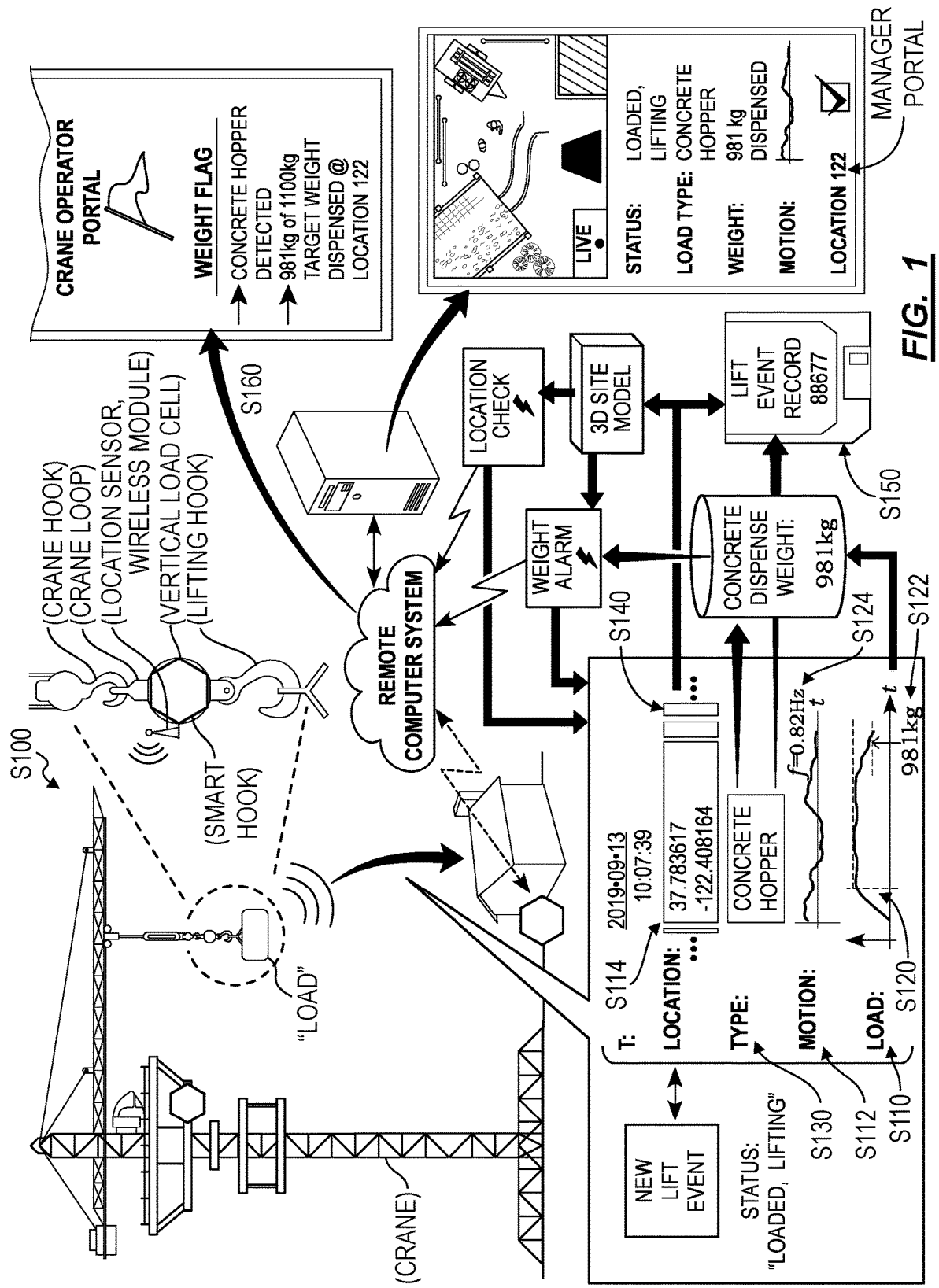
FIG. 1 is a flowchart representation of a method.

As shown in FIG. 1, a method S100 for tracking lifting events at a construction site includes: accessing a first timeseries of load values output by a weight sensor, coupled to a crane hook, during a first time period in Block S110; accessing a first timeseries of motion values output by a motion sensor coupled to the crane hook in Block S112; accessing a first geospatial location of the crane hook during the first time period in Block S114; deriving a lifting profile from the first timeseries of load values in Block S120; deriving a first oscillation characteristic from the first timeseries of motion values in Block S124; identifying a type of an object, carried by the crane hook during the first time period, based on the lifting profile and the oscillation characteristic in Block S130; accessing a second geospatial location of the crane hook during unloading of the object from the crane hook in Block S140; and storing the type of the object, a pickup location of the object at the first geospatial location, and a drop-off location of the object at the second geospatial location in a lift event record for the object in Block S150.

Figure 2:
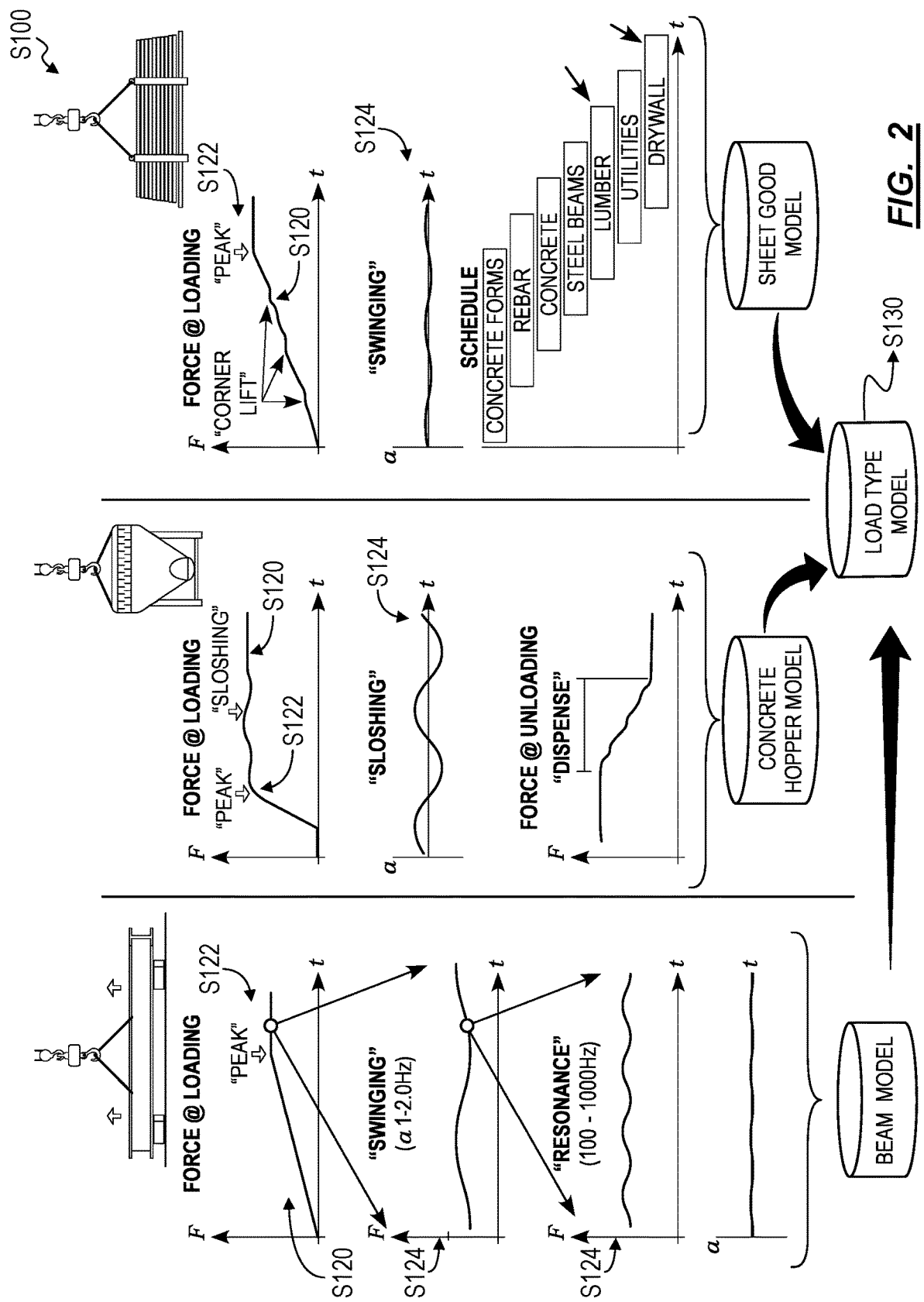
FIG. 2 is a flowchart representation of one variation of the method.

One variation of the method S100 shown in FIGS. 1 and 2 includes: accessing a first timeseries of load values output by a weight sensor, coupled to a crane hook, during a first time period in Block S110; accessing a first geospatial location of the crane hook during loading of an object onto the crane hook during the first time period in Block S114; deriving a lifting profile at the first geospatial location from the first timeseries of load values in Block S120; deriving a first weight of the object from the first timeseries of load values in Block S122; identifying a type of the object carried by the crane hook during the first time period based on the lifting profile in Block S130; accessing a second geospatial location of the crane hook during unloading of the object from the crane hook in Block S140; and generating a lift event record defining the type of the object, the first weight of the object, a pickup location of the object at the first geospatial location, and a drop-off location of the object at the second geospatial location in Block S150.

2. Applications

Generally, Blocks of the method S100 can be executed by or in conjunction with a "smart hook" carried by a crane at a construction site in order to access non-visual data from sensors integrated into the smart hook, to automatically identify objects (e.g., materials, tools, equipment) moved throughout the job site by the crane, and to generate records of lift events at the construction site. In particular, while the smart hook is carried by a crane and manipulated by the crane and construction staff to move tools and materials within a construction site, a remote computer system or a controller integrated into the smart hook can execute Blocks of the method S100 to: access load, motion, optical, and/or geospatial location data from the smart hook; interpret types of these loads carried by the crane; and generate lift event records representing types, magnitudes, locations, and trajectories of these loads moving throughout the construction site over time.

For example, the smart hook (or the remote computer system) can implement template matching, deep learning, and/or artificial intelligence techniques to distinguish different types of objects lifted by the separation membrane, such as including: a long steel beam based on a linear increase in load measured by the weight sensor in the smart hook as the beam is lifted and low-amplitude natural vibrations between 100 Hz and 1000 Hz measured by a motion sensor (e.g., an inertial measurement unit, an accelerometer) in the smart hook once the beam is fully lifted; a bundle of loose rebar based on a continuous but non-linear increase in load measured by the weight sensor as the bundle is lifted and moderate-amplitude natural vibrations between 0.1 Hz and 5 Hz measured by the motion sensor once the bundle is fully lifted; and a loaded concrete hopper based on high-amplitude oscillations between 0.1 Hz and 2 Hz (i.e., from wet concrete "sloshing" inside a drum in the concrete hopper) and lower-amplitude, higher-frequency machine vibrations (i.e., from a motor rotating the drum) measured by the motion sensor once the concrete hopper is fully lifted. In these examples, the smart hook (or the remote computer system) can generate a lift event for each of these loads. For each of these lift events, the smart hook can also store: a maximum (or "peak") weight measured by the weight sensor during the lift event; geospatial locations output by the geospatial position module when the load was first detected and then unloaded; and altitudes output by an altimeter in the smart hook when the load was first detected and then unloaded. Furthermore, when the concrete hopper is then unloaded, lifted away from the drop-off location, and returned to the pickup location, the smart hook (or the remote computer system) can record a change in weight of the concrete hopper as an amount of concrete delivered to this drop-off location and write this amount of concrete to the corresponding lift event record.

Therefore, the smart hook (and/or the remote computer system) can execute Blocks of the method S100 to automatically detect types and other characteristics of object moved throughout a construction site by a crane and to generate a sequence of lift event records—representative of critical activities at the construction site—based on these data.

3. Local v. Remote Load Identification and Lift Event Record Generation

The method S100 is described herein as executed locally by the smart hook. For example, the smart hook can include an integrated controller that locally executes Blocks of the method S100 to generate lift event records, select or define load handling specifications, select or define buffer distances, and selectively issue object motion alarms and object location alarms based on data collected by sensors integrated into the smart hook. The smart hook can then: transmit lift event records to a local computing device and/or to a remote computer system for storage, construction activity timeline generation, and/or insight extraction; and transmit alarms to a crane operator panel, site manager, etc.

However, Blocks of the method S100 can additionally or alternatively be executed by a computer system (hereinafter the "remote computer system") remote from the smart hook based on load, geospatial location, motion, and/or camera data collected and broadcast by the smart hook during operation at the construction site. For example, the smart hook can record and transmit these data to a local wireless gateway over a local wireless network. The wireless gateway—such as located inside a cab or near a base of the crane—can then return these data to a remote computer system (e.g., a remote server) via a computer network (e.g., a computer network, a local area network). Alternatively, the smart hook can transmit these data directly to the remote computer system, such as via a cellular network. The remote computer system can then execute Blocks of the method S100 remotely to generate lift event records and to trigger alarms for the construction site.

In another example, the smart hook transmits data to a local computing device located on the construction site—such as a desktop computer, laptop computer, or mobile device—via a local wireless network; and the local computing device then executes Blocks of the method S100 locally to generate lift event records for the construction site. However, the smart hook and/or any other local or remote computer system can execute Blocks of the method S100 in (near) real-time or asynchronously to automatically generate lift event records and to issue alarms for materials and equipment moved throughout the construction site by a crane.

4. Smart Hook

Figure 6:
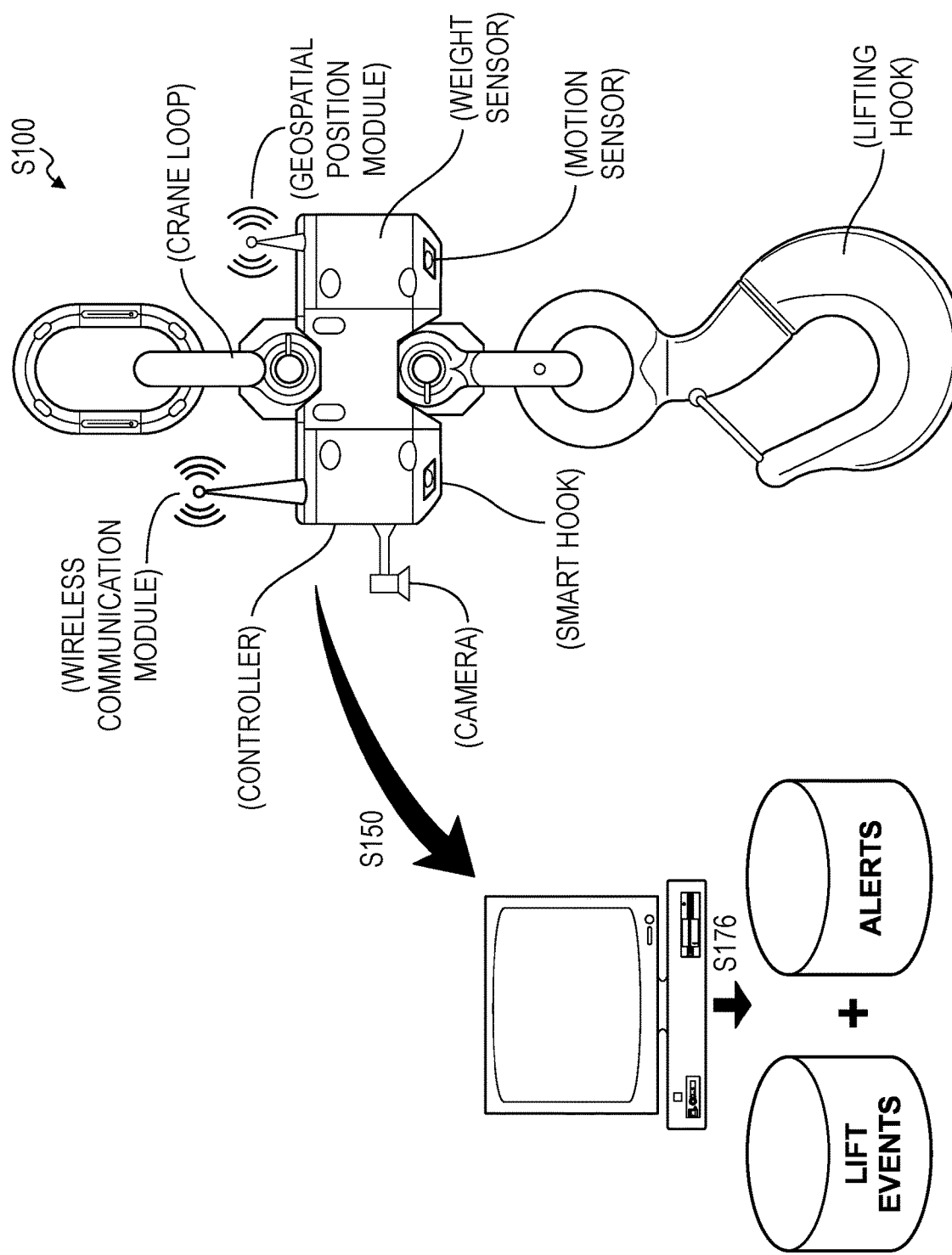
FIG. 6 is a flowchart representation of one variation of the method.

In one implementation shown in FIG. 6, the smart hook (or "hook adapter") includes: a crane loop (e.g., a "welded link," "oval ring," or shackle) configured to transiently (i.e., temporarily, removably) install on a crane hook of a crane; a lifting hook arranged below the crane hook and configured to couple to a load; a weight sensor (e.g., a load cell) interposed between the crane loop and the lifting hook and configured to output a signal representing a tensile force between the crane loop and the lifting hook; a motion sensor (e.g., a gyroscope, accelerometer, magnetometer, and/or IMU) configured to output signals representing accelerations and/or angular velocities of the smart hook; an optical sensor (e.g., a color camera, a depth sensor, a 3D camera, and/or an infrared camera) defining a field of view facing downward below the lifting hook; a geospatial position module configured to output its geospatial location; an altimeter configured to output a signal representative of the height of the smart hook; a controller configured to sample the weight sensor, the motion sensor, the optical sensor, and the geospatial position module and/or to transform these signals into lift event records according to the method S100; and a wireless communication module configured to transmit raw data output by the weight sensor, the motion sensor, the optical sensor, and the geospatial position module and/or to transmit lift event records to a remote computer system. (The smart hook can also include other sensors, such as an RFID reader, a humidity sensor, an infrared camera, an ultrasonic depth sensor, and/or a scanning LIDAR sensor.)

Generally, the smart hook can be rapidly deployed to cranes of various sizes and lifting capacities by placing the crane loop over a crane hook with the lifting hook hanging below the crane loop. A load (e.g., construction materials, construction equipment, scaffolding) may then be attached to the lifting hook, which transfers the weight of the load into the crane loop, which transfers the weight of the load and the smart hook into the crane hook thus carried by the crane. In particular, the smart hook: is configured for rapid deployment to a crane without modification to structural elements of the crane; and includes sensors that enable tracking of load weight, motion, and 3D position (e.g., geospatial location and altitude) directly at the lifting hook carrying the load (i.e., rather than remotely from the load). Furthermore, because the smart hook is self-contained and is configured to install onto and hang below a crane hook integrated into a crane, the smart hook can be rapidly installed and removed from a crane hook by simply lifting the crane loop onto and off of a crane hook. Therefore, the smart hook may follow a general contractor or site manager to various job sites over time in order to supply load-related insights to the general contractor or site manager over time.

5. Setup/Onboarding

When the smart hook is deployed to a construction site, a site manager (e.g., a general contractor) can upload a site schedule—defining an ordered or time-referenced sequence of activities (or "tasks") planned at the construction site during a project—to a manager portal, such as accessed through a web browser or native application executing on a desktop computer or mobile device (e.g., a smartphone, a tablet). For example, the site manager can upload a table, Gantt chart, timeline, or other electronic document containing dates and/or time windows that materials and equipment—of specified types and/or of specified weights—are scheduled to move from pickup locations to drop-off locations on the construction site in order to remain on schedule. The remote computer system can then parse load type, load weight, load pickup location, load drop-off location, and load drop-off time window data from this electronic document and generate a lift event tags for these loads accordingly.

Alternately, the site manager can manually enter these data directly into the manager portal. However, the remote computer system can access and ingest material and equipment flow data for the construction site in any other way.

5.1 Notification Setup

In one variation, the computer system also interfaces with the site manager (or other user)—such as via the manager portal—to define notification triggers for distributing electronic notifications to personnel affiliated with the construction site responsive to lift events detected by the smart hook. In one implementation, the computer system interfaces with the user to define task-based notification triggers, such as: a notification trigger for a particular construction task; a notification trigger for any instance of a repeated construction task (e.g., formwork installation); a notification trigger for misordered construction tasks; and/or a notification trigger for a particular sequence of construction tasks.

For example, the computer system can interface with the site manager to define and store notification triggers for transmitting electronic notifications to the site manager responsive to: identifying an object of a particular type loaded onto the smart hook; unloading of an object of a particular type from the smart hook; loading of an object of a particular type onto the smart hook at a particular geospatial location; unloading of an object of a particular type from the smart hook at a particular geospatial location; loading a particular object onto the smart hook; unloading a particular object from the smart hook; unloading a particular object from the smart hook at its assigned install location; unloading a particular object from the smart hook at more than a threshold distance from its assigned install location; and/or failure to detect an object of a particular object type within a threshold time after a schedule lift event specifying the particular object type; etc. The computer system can additionally or alternatively interface with the site manager to define and store notification triggers for transmitting electronic notifications to other personnel on the construction site, such as a crane operator.

6. Active State

Blocks S110, S112, and S124 recite: accessing a first timeseries of load values output by a weight sensor, coupled to a crane hook, during a first time period; accessing a timeseries of load motion values output by a motion sensor, coupled to the crane hook, during the first time period; and accessing a first geospatial location of the crane hook during the first time period. Generally, once deployed to a construction site and upon entering an active state, the smart hook can sample its integrated sensors and aggregate these data in Blocks S110, S112, and S124.

In one implementation, once in the active state, the smart hook: samples the geospatial position module and records geospatial locations of the smart hook at regular intervals (e.g., once per ten-second interval); samples the altimeter (e.g., at 1 Hz); averages outputs of the altimeter over the sampling interval of the geospatial position module to calculate an average altitude of the smart hook during this interval; merges geospatial locations output by the geospatial position module and concurrent altitudes of the smart hook into "3D geospatial locations" of the smart hook during these intervals; and writes these timestamped 3D geospatial locations to a local rolling buffer (e.g., a one-minute rolling buffer) in local memory. In this implementation, the smart hook can also: sample the motion sensor (e.g., at a rate of 50 Hz); sample the weight sensor (e.g., at a rate of 10 Hz); record images (e.g., 2D color photographic images) output by the optical sensor (e.g., at a rate of 1 Hz); and write these timestamped 3D geospatial locations to the local rolling buffer.

Furthermore, the smart hook can: verify absence of vertical motion of the smart hook over a period of time based on outputs of the altimeter; verify minimal or no lateral motion (e.g., "swinging") of the smart hook over this period of time based on concurrent outputs of the motion sensor; and confirm absence of a load carried by the lifting hook during this period of time based on concurrent outputs of the weight sensor. Upon confirming absence of vertical motion, lateral motion, and a load on the lifting hook, the smart hook can tare the weight sensor, such as by averaging outputs of the weight sensor over this period of time (e.g., five seconds) and storing this average as a tare value of the weight sensor.

7. Live Crane Feed

While sampling these sensors when in the active state, the smart hook can also stream these data—such as including images recorded by the optical sensor, geospatial locations and altitudes of the smart hook, accelerations detected by the motion sensor and a weight (above the tare value) measured by the weight sensor—to the remote computer system. The remote computer system can then publish data to a live construction site feed accessible via the manager portal described above. (Additionally or alternatively, the remote computer system can then transmit real-time construction-related notifications in the form of SMS messages to the site manager's mobile device.) (or via another online portal.) The site manager or other operator may then access this live construction site feed to view a live "bird's-eye view" of the construction site and to monitor the current weight magnitude carried by the smart hook, current movement of the smart hook, the current altitude of the smart hook, and the current geospatial location of the smart hook.

8. Object Types and Object Models

In one variation shown in FIG. 2, upon entering the active state, the smart hook retrieves a list of object types scheduled for movement through the construction site around the current time and/or object models (e.g., template motion profiles, template load profiles, and/or neural networks) for identifying types of these objects.

In one implementation, upon entering the active state (e.g., when moved, when manually activated, or at the start of a scheduled work day or work week), the smart hook queries the remote computer system for types of objects designated in scheduled crane-related activities in the site schedule (e.g., concrete, steel beams, rebar, and/or scaffolding elements) around a current time, such as: on the current work day; during the current work week; up to 24 hours before and up to 24 hours after the current time; or for the duration of the project at the construction site. In this implementation, the remote computer system queries the site schedule for object types designated in these scheduled crane-related activities and returns a list of these object types to the smart hook. More specifically, the remote computer system can return a list of object types that represents objects that the crane and smart hook are likely to lift during a current work period. The smart hook can store this list of object types in local memory and/or adjust local object models to reflect a greater probability or expectation that the smart hook will interface with objects of these types during the upcoming work period.

In this variation, the remote computer system can also return additional data related to these scheduled crane-related activities to the smart hook, such as: an order or schedule of lift events for particular object types at the construction site; approximate weights or weight ranges of object types designated in these scheduled lift events during the work period; last known geospatial locations of specific objects designated in this lift events; and/or geospatial locations that objects of specific types or objects associated with specific lift events are stored or staged at the construction site; etc. The smart hook can also store these object data in local memory.

Additionally or alternatively, in this variation, the smart hook can download object models for identifying these object types, such as in the form of: weight ranges and loading/unloading profiles (or "template loading curves") for distinguishing object types in timeseries load data captured by the weight sensor; natural frequency ranges or natural frequency profiles (or "template vibration curves") for distinguishing object types in timeseries motion data (e.g., acceleration, angular velocity data) captured by the motion sensor; and/or template images, color models, and/or symbol models for identifying object types in images recorded by the optical sensor based on features extracted from these images.

Additionally or alternatively, these object models can specify physical object characteristics (e.g., common dimensions, color) and/or operational knowledge (e.g., rigging methods, unloading and installation methods). The smart hook can thus identify an object carried by the smart hook further based on these object models and other features extracted from images and/or motion data captured by the smart hook during a lift event.

Alternatively, the smart hook can implement neural networks or other models trained to distinguish types of objects loaded onto the smart hook based on timeseries load data, timeseries motion data, and/or photographic images.

9. New Lift Event

While in the active state, the smart hook can: sample the weight sensor; convert outputs of the weight sensor into weight magnitudes; and write these timestamped weight magnitudes—along with motion data read from motion sensors, geospatial location data, and altitude—to a local rolling buffer (e.g., a one-minute rolling buffer). When the weight magnitude measured by the weight sensor exceeds the stored tare value by more than a threshold weight (e.g., 50 kilograms), the smart hook can: detect a new lift event at the smart hook; initialize a new lift event record for this new lift event; and write contents of the buffer (e.g., raw sensor data) to the new lift event record. The smart hook can then continue to sample the weight sensor, the motion sensor, the geospatial position module, and the altimeter, etc. (e.g., at the same or greater sampling rates) and write these data to new lift event record.

Upon detecting a new lift event, the smart hook can also transmit a "loading" status to the remote computer system to indicate to the remote computer system that the smart hook is currently being loaded with an object. The remote computer system can then update a status of the smart hook in the manager portal to reflect this new status of the smart hook, thereby enabling the site manager or other operator viewing the manager portal to immediately see a live change in the status of the smart hook.

10. Object Type Identification

Figure 3:
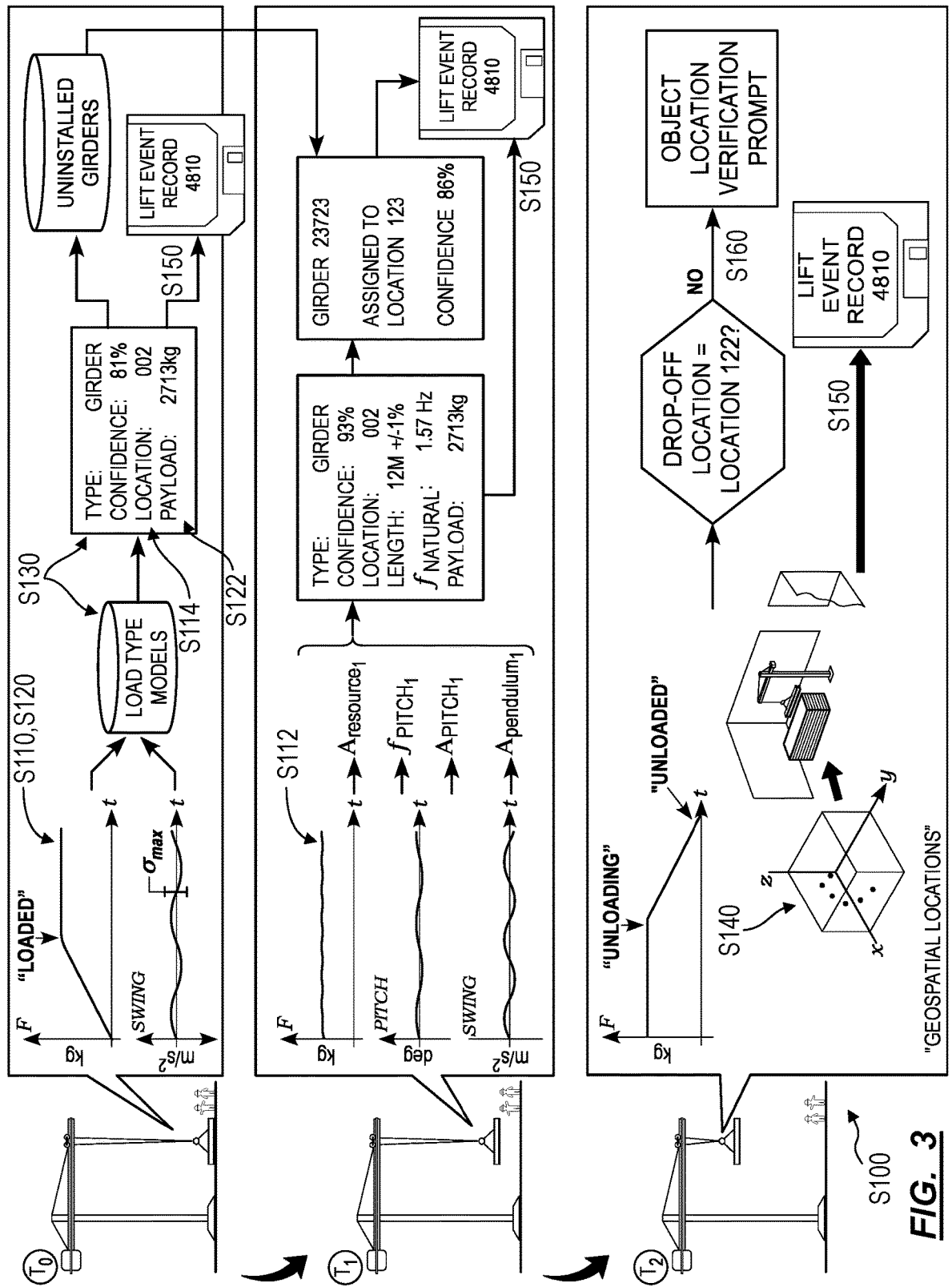
FIG. 3 is a flowchart representation of one variation of the method.
Figure 4:
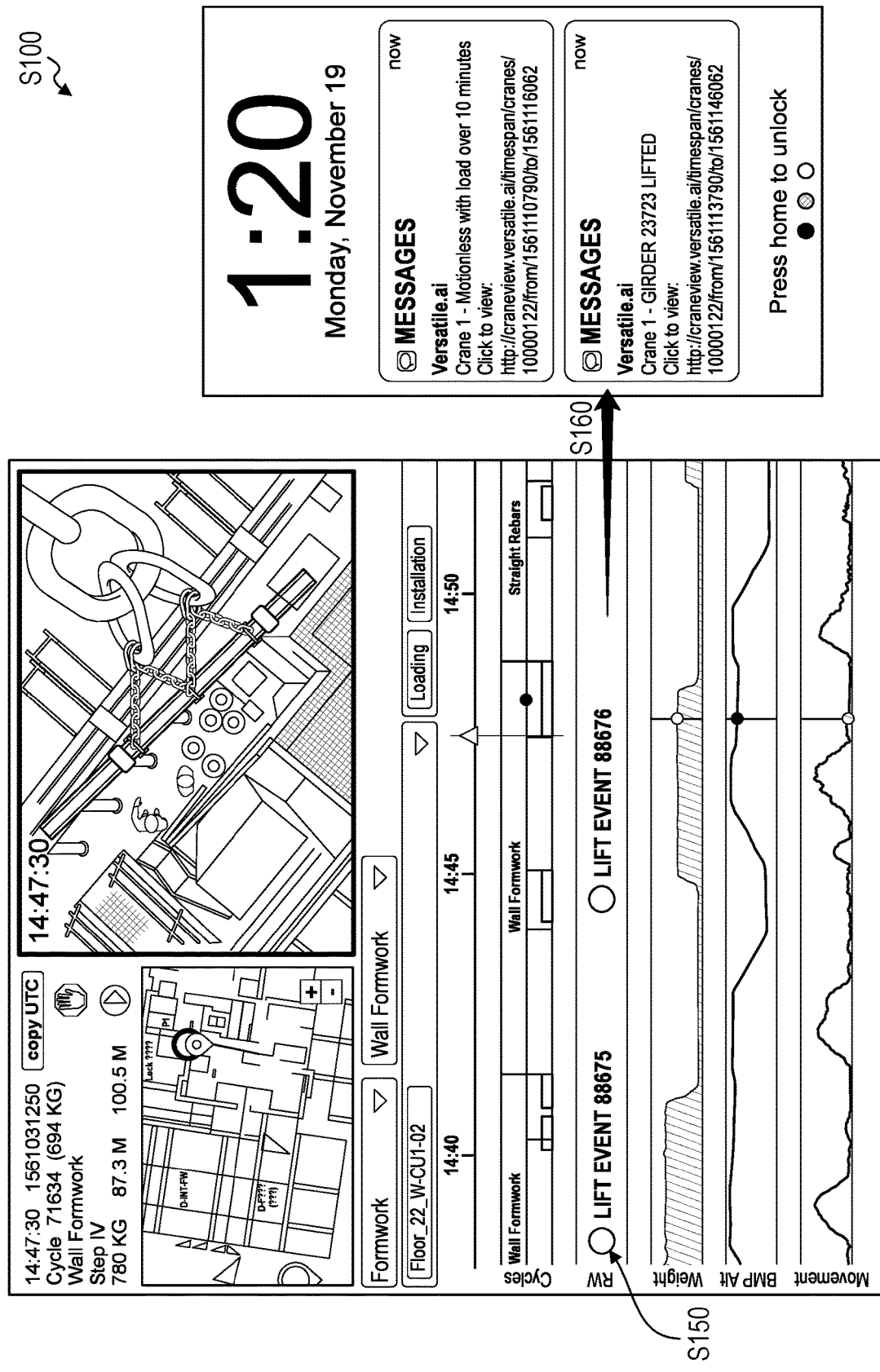
FIG. 4 is a flowchart representation of one variation of the method.

Blocks S120, S124, and S130 of the method S100 recite: extracting a lifting profile from the timeseries of load values; extracting an oscillation characteristic from the timeseries of motion values; and identifying a type of an object carried by the crane hook during the first time period based on the lifting profile and the oscillation characteristic in Block S130. Generally, in Blocks S120, S124, and S130, the smart hook can automatically identify a type of object (and other characteristics of this object) carried by the smart hook based on timeseries data collected by weight sensor and/or the motion sensor, etc. In particular, the smart hook can derive a "fingerprint" of the load in each of multiple sensor modalities, predict the identity of the load in this different sensor modalities based on data collected by these sensors, and then fuse these predictions to identify a type of the load with greater confidence, as shown in FIGS. 1, 2, and 3.

10.1 Loading Profile

In one implementation shown in FIG. 1, the smart hook: records a timeseries of weight values read from the weight sensor following the start of the new lift event; calculates a derivative of this timeseries of weight values; and isolates a segment of this timeseries exhibiting a null or near-null derivative and corresponding to a "loading period." The smart hook then extracts a loading profile (e.g., a curve geometry, a rate of change) from the timeseries of weight values recorded over this loading period and matches this loading profile to a template loading profile for a particular object type.

10.2 Motion Profile

The smart hook can similarly: monitor lateral and vertical timeseries acceleration signals output by a multi-axis accelerometer (e.g., within an inertial measurement unit) in the smart hook; and identify the object based on these timeseries acceleration values. For example, the smart hook can identify a load carried by the smart hook as a concrete hopper in response to detecting a low-frequency, decaying signal component in a signal—output by a horizontal axis in an accelerometer integrated into the smart hook—which may result from concrete sloshing laterally inside the concrete hopper, as shown in FIG. 1.

Additionally or alternatively, the smart hook can similarly: monitor angular velocity signals output by a multi-axis gyroscope (e.g., within the inertial measurement unit) in the smart hook; and identify the object based on these timeseries angular velocity values. For example, because longer objects may angularly accelerate at slower rates than shorter objects of the same mass, the smart hook can: calculate a confidence score that an object carried by the smart hook is an elongated steel beam inversely proportional to a change in yaw rate detected by the multi-axis gyroscope during the lift event; and calculate a confidence score that the object is a stack of sheet materials proportional to this change in yaw rate.

10.3 Weight

In another implementation shown in FIG. 1, the smart hook stores common weight ranges for objects of different types (e.g., full or empty concrete hoppers, steel beams, concrete forms, full stacks of sheet goods, rebar bundles), such as common weight ranges for many construction projects or for the particular construction site currently occupied by the smart hook. The smart hook can then: derive a payload size (or "weight") of the object from load data captured by the weight sensor in Block S122; and calculate a confidence score that an object currently carried by the smart hook is of a particular object type based on proximity of this payload size to a weight range associated with this particular object type.

10.4 Location

In yet another implementation shown in FIG. 1, the smart hook stores: last known geospatial locations and altitudes of objects of known types at the construction site; geospatial locations and altitudes of staging areas for particular object types at the construction site; and/or geospatial locations and altitudes of drop-off (or "delivery") locations for particular object types at the construction site, such as a function of date, week, or project stage at the construction site. The smart hook can then calculate a confidence score that an object currently carried by the smart hook is of a particular object type based on proximity of the geospatial location of the smart hook when the object was loaded to a last known location of objects of this type and/or to an assigned staging area of objects of this type. Similarly, as the object is unloaded from the smart hook at the end of a lift event, the smart hook can calculate a confidence score that an object currently carried by the smart hook is of a particular object type based on proximity of the geospatial location of the smart hook when the object was unloaded to a drop-off location assigned to objects of this type.

The smart hook can also calculate or refine a confidence score that an object currently carried by the smart hook is of a particular object type based on proximity of the current time to a scheduled lift event designating this object type.

10.5 Images

Figure 5:
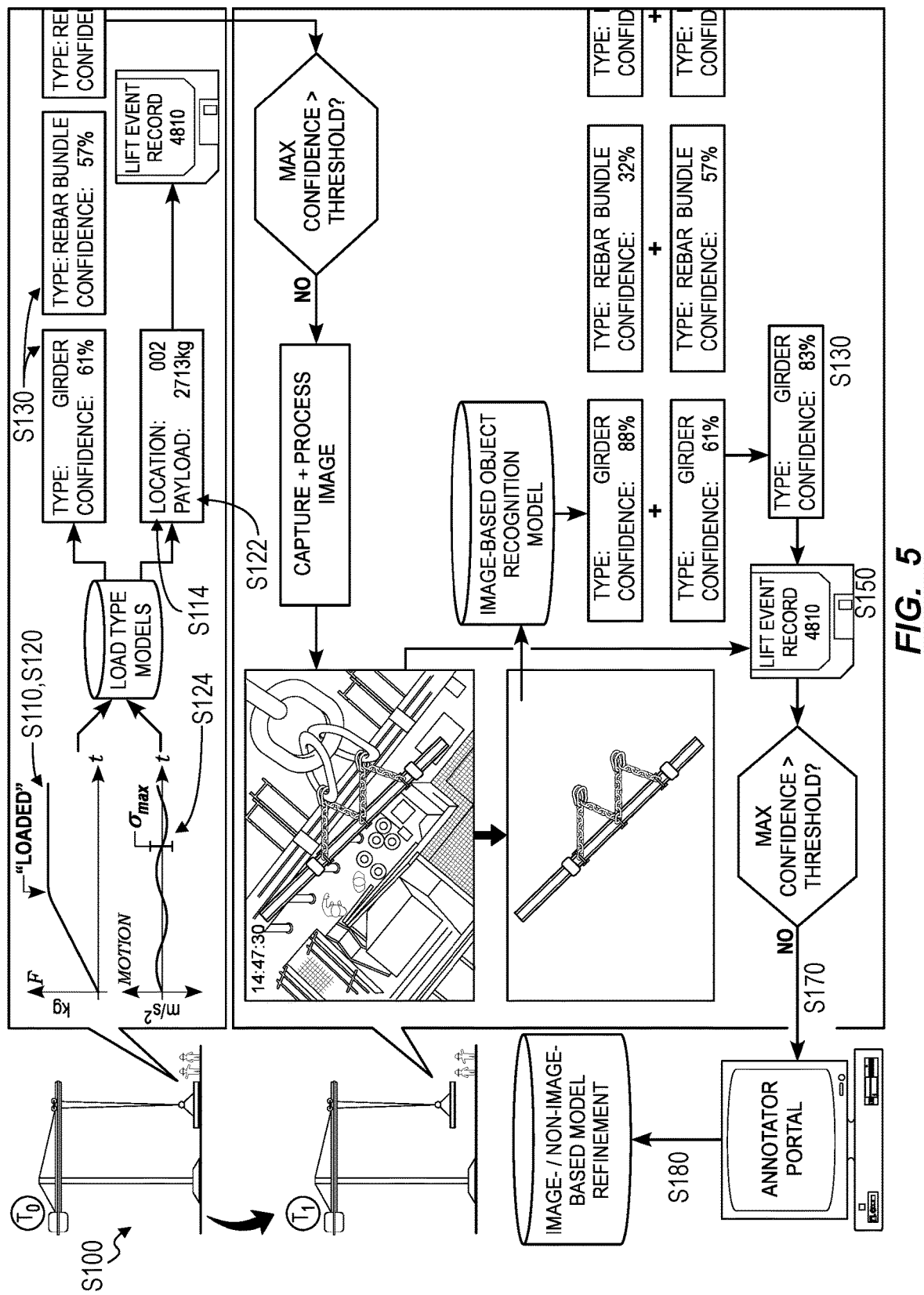
FIG. 5 is a flowchart representation of one variation of the method.

In another implementation shown in FIG. 5, the smart hook implements object detection, object recognition, optical characteristic recognition, template matching, and/or other computer vision techniques to identify the type of object loaded onto the smart hook based on features extracted from an image captured by the optical sensor.

For example, in response to detecting an increase in load—from a tare value—carried by the smart hook, the smart hook can: detect a new lift event; and capture a photographic image from a downward-facing camera integrated into the smart hook. The smart hook can then pass this photographic image into a neural network (e.g., a deep convolutional network for object detection, a fully convolutional network for semantic segmentation) to: extract features from a foreground in the photographic image; and identify the type of the object based on these features. Alternatively, after identifying the type of the object based on loading and motion data captured during this lift event, the smart hook can verify the object type thus identified based on this photographic image (e.g., based on features extracted from the photographic image).

In this implementation, the smart hook can also interpret pitch, roll, and/or yaw orientations of the object—relative to the smart hook—based on features detected in a photographic image. By repeating this process while the object is loaded onto the smart hook, the smart hook can track the pitch, roll, and/or yaw orientations of the object—relative to the smart hook—throughout this lift event in near real-time based directly on visual features extracted from images of the object hanging below the smart hook.

The smart hook can additionally or alternatively include other types of optical sensors. For example, the smart hook can include a thermographic (or infrared) camera and can distinguish between metal (e.g., rebar, steel girders), wood (e.g., formwork), concrete, and other materials of objects loaded onto the smart hook based on thermal signatures extracted from regions of thermographic images depicting these objects carried by the smart hook. In a similar example, the smart hook can include a hyperspectral or multispectral camera and can distinguish between metal, wood, concrete, and other materials of objects loaded onto the smart hook based on spectral signatures extracted from regions of hyperspectral or multispectral images depicting these objects carried by the smart hook.

11. Fusion

Block S130 of the method S100 recites identifying a type of an object carried by the crane hook during the first time period based on the lifting profile and the oscillation characteristic. Generally, in Block S130, as the smart hook calculates confidence scores that an object currently loaded onto the smart hook is of a particular object type based on data collected by sensors integrated into the smart hook, the smart hook can aggregate these confidence scores for various object types across multiple sensor modalities into one prediction of the type of the object, as shown in FIGS. 1, 2, 3, and 5.

11.1 Voting

In one implementation, the smart hook can implement a voting architecture, decision tree, linear regression, or any other structure to fuse or aggregate predictions for the type of object—based on sensor data of different types—into one predicted identity of the object.

In this implementation shown in FIGS. 1 and 2, the smart hook can: derive a lifting profile—representing transition of the weight of the object onto the smart hook from a first time to a second time spanning a loading period—from a timeseries of load values captured by the smart hook; detect a peak load, in the timeseries of load values, representing complete loading of the object onto the smart hook at the second time; and store this peak load as the weight of the object. The smart hook can then: derive a natural frequency of the object from a second timeseries of load values captured by the smart hook over a traversal period following the second time (i.e., once the object is fully loaded onto the smart hook); and derive a pitch frequency of the object (e.g., a frequency than the object pitches, rolls, or "sloshes" while suspended from the smart hook) from a second timeseries of motion values (and/or from the second timeseries of load values) captured by the smart hook during the traversal period.

The smart hook can then: identify a set of object types allocated to the construction site generally or designated for relocation by the crane during a current work period (e.g., the current day, a current shift); retrieve object profiles for these object types; calculate a set of pitch frequency similarity scores for the object, wherein each pitch frequency similarity score in the set represents proximity of the pitch frequency of the object to a pitch frequency range of an object type in this set of object types; calculate a set of natural frequency similarity scores for the object, wherein each natural frequency similarity score in the set represents proximity of the natural frequency of the object to a natural frequency range of an object type in this set of object types; calculate a set of weight similarity scores for the object, wherein each weight similarity score in the set represents proximity of the weight of the object to a range of weight of an object type in this set of object types; calculate a set of loading similarity scores for the object, wherein each loading similarity score in the set represents proximity of the slope and an oscillation characteristic of the loading profile of the object to ranges of slopes and oscillation characteristics of an object type in this set of object types; and/or calculate a set of pickup location similarity scores for the object, wherein each pickup location similarity score in the set represents proximity of the geospatial location of the smart hook when the object was loaded onto the smart hook to a last known location of an object type, in this set of object types, on the construction site; etc.

The smart hook can then identify the object as a unit of a particular object type based on a combination of the set of pitch frequency similarity scores, the set of natural frequency similarity scores, etc. For example, for a first object in the set of objects allocated to the construction site, the computer system can: calculate a combination (e.g., a linear combination, a weighted combination) of the pitch frequency similarity score, the natural frequency similarity score, the weight similarity score, the loading similarity score, and/or the pickup location similarity score between the object and the first object type; and then store this resulting combination as a confidence score that the object is a unit of the first object type. The smart hook can then repeat this process for each other object type in the set.

Subsequently, the smart hook can identify a particular object type associated with a highest confidence score in this set. If the confidence score for the particular object type exceeds a minimum confidence score, the smart hook can confirm identification of the object as a unit of this particular object type. Conversely, if the confidence score for the particular object type is less than the minimum confidence score, the smart hook can: provisionally identify the object as a unit of this particular object type; mark the object as provisionally identified in subsequent notifications and lift event records generated by the smart hook (or the remote computer system) for this object; and continue to refine and validate identification of the object based on subsequent data captured by the smart hook during this lift event, as described below.

Upon identifying the type of the object, such as with greater than a threshold confidence, the smart hook can transmit an identifier for this object type to the remote computer system, and the remote computer system can update the manager portal to indicate that an object of this type is currently loaded onto the smart hook. The smart hook can also write the identifier of this object type to the current lift event record.

11.2 Artificial Intelligence and Deep Learning

Additionally or alternatively, the smart hook can implement artificial intelligence, machine learning, and/or deep learning techniques: to ingest timeseries load, motion, and/or geospatial location data, etc. recorded as the object is loaded onto and carried by the smart hook; and to output a confidence score or rank for a type of the object carried by the smart hook. The smart hook can then execute methods and techniques described herein based on a highest-confidence object type thus identified during a lift event by the smart hook.

11.3 Site Level Refinement

In another implementation, the smart hook implements a site-, entity (e.g., site manager, building company), or object type-specific model that defines weights of object type predictions—derived from various sensor data types—for fuing object type predictions from multiple sensor data types into one final object type prediction. In one example, the smart hook calculates a confidence score of 0.9 that an object carried by the smart hook during a lift event is a mesh grating based on features extracted from a photographic image of the object. However, the remote computer system can determine from historical data collected at the construction site that predictions for a mesh grating based on images captured at the construction site are accurate in approximately 75% of instances. Accordingly, the remote computer system (or the smart hook) can assigned a weight of 75% to the image-based 0.9 confidence score that the object is the mesh grating or otherwise adjust (or "correct") this confidence score based on this 75% historic accuracy rate.

The remote computer system can implement similar methods and techniques to: derive historical accuracy rates of object type predictions based on each of image features, weight, motion data, loading data, and/or geospatial data, etc. at the particular construction site and/or for the particular entity (e.g., a site manager, a construction crew); and then adjust models or coefficients for fusing these object type predictions from different sensor modalities according to corresponding historical accuracy rates.

11.4 Concrete Hopper

In one example shown in FIGS. 1 and 2, a concrete hopper may represent a relatively short, substantially rigid structure characterized by a short loading period relative to payload size (e.g., a loading profile with a steep slope) when lifted. However, concrete contained in the concrete hopper may "slosh" when the concrete hopper is moved or jostled during lifting. Therefore, a signal output by the weight sensor when a concrete hopper is loaded onto the smart hook may also be characterized by a large secondary oscillating component at a relatively low frequency (e.g., 0.5-2 Hz) and decaying rapidly. The smart hook can therefore: store a concrete hopper loading profile that represents these low loading-period-to-peak-load ratios and secondary oscillating signal components that quickly decay; and calculate a confidence score that an object being loaded onto the smart hook is a concrete hopper based on (e.g., proportional to) proximity (e.g., similarity) of a signal read from the weight sensor to this concrete hopper loading profile.

The smart hook can also calculate a sloshing frequency of the concrete hopper, such as by implementing Fourier analysis to extract a sloshing frequency from a motion signal and/or a load signal captured during this period. Furthermore, the smart hook can predict a fill level of the concrete hopper based on (e.g., proportional to) this sloshing frequency, such as: a fill level of 25% full for a sloshing frequency of 0.61 Hz; a fill level of 50% full for a sloshing frequency of 0.78 Hz; a fill level of 75% full for a sloshing frequency of 0.84 Hz; and a fill level of 90% full for a sloshing frequency of 0.86 Hz. The smart hook can then: record this sloshing frequency, the fill level, a total payload size, and the confidence score that the object is a concrete hopper to a new lift event record; retrieve or calculate a load handling specification for concrete hoppers; and/or retrieve or calculate a buffer distance for concrete hoppers.

In a similar example, the smart hook: derives a lifting profile—representing transition of the weight of the object onto the smart hook over a loading duration—from a timeseries of load values captured by the smart hook; detects a peak load, in the timeseries of load values representing complete loading of the object onto the smart hook; stores this peak load as the weight of the object; and derives a pitch frequency of the object (e.g., a frequency than the object pitches, rolls, or "sloshes" while suspended from the smart hook) from a timeseries of motion values captured by the smart hook once the object is fully loaded onto the smart hook. The smart hook then compares these load characteristics to object templates for different object types and identifies the object as a concrete hopper: if the first loading duration falls within a template range of loading durations associated with concrete hoppers (e.g., defined in a concrete hopper template or profile); if the pitch frequency falls within a template range of sloshing frequencies associated with concrete hoppers; and if the weight of the object falls between an empty weight and a full weight of concrete hoppers deployed at the construction site (e.g., defined in a concrete hopper template or profile).

11.5 Example: Steel Beam

In another example shown in FIGS. 2 and 3, a steel beam may represent a relatively long, substantially rigid structure. Therefore, a signal output by the weight sensor when a steel beam is loaded onto the smart hook may be characterized by a short loading period relative to payload size (e.g., a loading profile with a steep slope) when lifted, similar to a concrete hopper. However, the ends of the beam may vibrate about the lift point at a natural frequency of the beam once the beam is fully lifted. Therefore, a signal output by the weight sensor once the steel beam is fully loaded onto the smart hook (e.g., immediately following the lifting period) may be characterized by a higher-frequency (e.g., 100-1000 Hz), low-amplitude secondary oscillating component that decays slowly. The smart hook can therefore: store a steel beam loading profile that represents these low loading-period-to-peak-load ratios and secondary oscillating signal components that decay slowly; and calculate a confidence score that an object loaded onto the smart hook is a steel beam based on proximity of a signal read from the weight sensor to this steel beam loading profile. (Furthermore, because the frequency of this low-amplitude secondary component of the load signal may be a function of the length, material, and area moment of inertia of the beam, the smart hook can also estimate a length and a size of the beam based on the frequency of this secondary oscillating component of the load signal.)

The smart hook can also: calculate a natural frequency of the steel beam (e.g., by implementing Fourier analysis) based on a motion signal and/or a load signal captured during this period; estimate a length of the steel beam based on (e.g., inversely proportional to) the natural frequency; and record this natural frequency, this estimated length, a total payload size, and the confidence score that the object is a steel beam to a new lift event record.

In a similar example, the smart hook (and/or the remote computer system) can: access a timeseries of load values from the weight sensor; identify initial coupling of the object to the smart hook at a first time in response to a first load value represented in this timeseries of load values exceeding a threshold load value; detect a peak load—in this timeseries of load values—at a second time succeeding the first time; and derive a lifting profile representing loading of the crane hook, via the smart hook, as a function of time from the first time to the second time based on this timeseries of load values. The smart hook can then: characterize a slope of the lifting profile (or a slope of the lifting profile as a function of time); calculate an oscillation characteristic of the lifting profile (e.g., magnitude and/or frequency of load oscillation along the lifting profile); and identify the type of the object based on the slope of the lifting profile and the oscillation characteristic(s) of the lifting profile, such as based on cumulative similarities of these characteristics to template characteristics or characteristic ranges of known object types, as described above.

11.6 Example: Rebar

In another example, a bundle of rebar beam may represent a relatively long, substantially flexible structure in which ends of the bundle remain loaded on the ground or other structure below as the middle of the bundle is lifted. Therefore, a signal output by the weight sensor when a bundle of rebar is loaded onto the smart hook may be characterized by a longer loading period relative to payload size (e.g., a loading profile with a shallower slope) when lifted. Furthermore, the ends of the bundle of rebar may also vibrate about the lift point at a lower natural frequency once the bundle is fully lifted. Therefore, a signal output by the weight sensor once the bundle of rebar is fully loaded onto the smart hook (e.g., immediately following the lifting period) may be characterized by a lower-frequency (e.g., 10-100 Hz), higher-amplitude secondary oscillating component that decays slowly. The smart hook can therefore: store a rebar bundle loading profile that represents these higher loading-period-to-peak-load ratios and secondary oscillating signal components that decay slowly; and calculate a confidence score that an object loaded onto the smart hook is a rebar bundle based on proximity of a signal read from the weight sensor to this rebar bundle loading profile. (Furthermore, because the frequency of this higher-amplitude secondary component of the load signal may be a function of the length, material, and area moment of inertia of the rebar in this bundle, the smart hook can also estimate lengths and sizes of rebar in this bundle based on the frequency of this secondary oscillating component of the load signal.)

The smart hook can also: calculate a natural frequency of the rebar bundle (e.g., by implementing Fourier analysis) based on a motion signal and/or a load signal captured during this period; estimate a length of the rebar bundle based on (e.g., inversely proportional to) the natural frequency; record this natural frequency, this estimated length, a total payload size, and the confidence score that the object is a rebar bundle to a new lift event record; retrieve or calculate a load handling specification for rebar bundles; and/or retrieve or calculate a buffer distance for rebar bundles.

11.7 Example: Sheet Goods

In yet another example shown in FIG. 2, a stack of sheet goods (e.g., plywood, drywall) may represent a relatively short, substantially rigid structure with a low natural frequency, and corners of the stack of sheet goods may lift in series from the ground or support structure when the stack of sheet goods is loaded onto the smart hook. Therefore, a signal output by the weight sensor when a stack of sheet goods is loaded onto the smart hook may be characterized by a short loading period relative to payload size (e.g., a loading profile with a steep slope) when lifted, and this loading profile may exhibit three or more discontinuities, peaks, or inflections as the stack of sheet goods is lifted. Furthermore, the stack of sheet goods may vibrate about the lift point at a very high natural frequency (e.g., greater than 2000 Hz) once the stack is fully lifted. Therefore, a signal output by the weight sensor once the stack of sheet goods is fully loaded onto the smart hook (e.g., immediately following the lifting period) may be characterized by a higher-frequency (e.g., 10-100 Hz), lower-amplitude secondary oscillating component that decays slowly. The smart hook can therefore: store a sheet good loading profile that represents these lower loading-period-to-peak-load ratios and secondary oscillating signal components that decay slowly; and calculate a confidence that score that an object loaded onto the smart hook is a sheet good based on proximity of a signal read from the weight sensor to this sheet good loading profile.

Furthermore, in this example, if the smart hook predicts that an object is a stack of sheet goods based on a load profile and motion of the object during lifting, the smart hook can: identify the stack of sheet goods as a concrete form rather than a stack of drywall or lumber if the payload size measured by the weight sensor is below a threshold weight; and distinguish a stack of drywall (e.g., late in construction) from lumber (e.g., midway through construction) based on objects scheduled for lifting during the current work period.

11.8 Example: Formwork v. Rebar

In a similar example, the smart hook predicts that an object is one of a formwork and a rebar structure based on a weight and motion of the object during lifting. The smart hook continues to monitor weight and motion of the object as the object is lifted moved laterally, lowered, and unloaded and identifies statuses of the object and the smart hook accordingly. The smart hook can also track a duration of an unloading event as the object is unloaded from the smart hook. If these duration is longer than a threshold duration—such as defined in a formwork model—the smart hook can identify the object as a formwork; otherwise, the smart hook can identify this object as a rebar structure following conclusion of the unloading event.

11.9 Example: Steel Beam v. Precast Concrete

In another example, if the smart hook (or the remote computer system) predicts that the object is either a steel beam or a precast concrete structure based on the pickup location and the weight recorded by the smart hook during the current lift event, the smart hook can: identify the object as a steel beam rather than a precast concrete structure if a secondary oscillating component of load and acceleration signals—output by the weight sensor and the motion sensor—are less than a threshold frequency (e.g., 1000 Hz); and then confirm that the object is a steel beam rather than a precast concrete structure if acceleration signals output by the motion sensor indicate that the object is oscillating about its pitch axis at a low frequency (e.g., less than 0.1 Hz).

11.10 Example: Steel Beam v. Rebar

In a similar example, the smart hook: implements the foregoing methods and techniques to derive a pitch frequency of the object (e.g., the rate at which the object pitches fore and aft on the smart hook) from a timeseries of motion values captured by the smart hook once the object is fully loaded onto the smart hook; and calculates a natural frequency of the object from a timeseries of load values captured by the smart hook once the object is fully loaded onto the smart hook. The smart hook then identifies the object as "elongated" in response to the pitch frequency falling below a threshold frequency. Then, after identifying the object as elongated, the smart hook can: identify the object as rebar (e.g., a rebar bundle) in response to the natural frequency of the object falling below a threshold frequency; and identify the object as a steel beam in response to the natural frequency of the object exceeding the threshold frequency.

12. Load Verification and Object Type Refinement

Furthermore, the smart hook can repeat the foregoing methods and techniques to verify or refine the type of object thus identified in Block S150 based on additional data collected by the smart hook after the object is loaded onto the smart hook and until the object is subsequently unloaded, as shown in FIG. 3. In particular, the smart hook can calculate increasing confidence scores for the identity of the object over time based on additional load, motion, and geospatial location data collected by the smart hook between a time the object is loaded onto the smart hook and a time that the object is unloaded from the smart hook.

In one example, ends of a long beam may be guided manually with rigging or tow lines when lifted at a pickup location and when lowered at a drop-off location. Manipulation of the beam via the rigging lines may yield acyclic vertical loads and acyclic angular velocities about the pitch and yaw axes of the steel beam with long ramp times and decay times. Therefore, if the smart hook detects acyclic load changes and acyclic angular velocities with long ramp times following detection of a payload size during a lift event, the smart hook can calculate a greater confidence that the object is a long beam.

In another example, when a long beam is lowered onto the ground or other structure below, one end of the beam may contact the ground first, thereby transferring some weight from this first end of the beam into the ground. As the length of the beam makes contact with the ground as the beam is further lowered, the weight of the beam carried by the smart hook may decrease continuously (e.g., approximately linearly). The load profile of the signal output by the weight sensor as a beam is unloaded from the smart hook may therefore be characterized by a substantially continuous downward slope from payload size to tare. Conversely, when a stack of sheet goods is lowered onto the ground or other structure, one corner of the stack may contact the ground first, thereby transferring some weight from this first corner of the stack into the ground. As the stack is further lowered, one edge of the stack may come into contact with the ground. As the stack is lowered even further and then fully unloaded from the smart hook, the opposing edge of the stack may come into contact with the ground. The load profile of the signal output by the weight sensor as a stack of sheet goods is unloaded from the smart hook may therefore be characterized by two or more discontinuities or inflections, which may differ from a load profile of a signal output by the weight sensor as a beam is unloaded from the smart hook, which may be characterized by one discontinuity or inflection.

In yet another example, a concrete hopper may be left attached and (partially) supported by the smart hook upon arrival at a drop-off location. Concrete may then be dispensed from the concrete hopper, and the concrete hopper may then be hoisted and moved away from this drop-off location by the smart hook. Therefore, once the concrete hopper is lowered at its drop-off location, the load measured by the weight sensor may decrease (slowly) from an initial payload size but may not reach the stored tare value before the measured load again increases as the concrete hopper is lifted. The smart hook can therefore identify an object as a concrete hopper if the object is delivered to a drop-off location at a first payload size and then removed from the drop-off location at a second, lower payload size without detecting fully unloading the object from the smart hook.

However, the smart hook can implement any other method or technique to identify and verify a type of object loaded onto the smart hook. Furthermore, upon refining an object type identification of an object carried by the smart hook, the smart hook can transmit an update of the detected object type to the remote computer system, and the remote computer system can update the manager portal to reflect this object type revision accordingly. The smart hook can also rewrite the identifier of this object type to the current lift event record.

12.1 Object Type Prediction Refinement Based on Load Status

In a similar implementation, the smart hook implements the foregoing methods and techniques to predict the type of the object loaded onto the smart hook based on an initial set of data captured by the smart hook at the beginning of the lift event and refines this prediction based on additional data captured by the smart hook as the object is fully loaded onto the smart hook, lifted by the crane, moved laterally, lowered, and unloaded from the smart hook.

In particular, the smart hook can: record its geospatial location and an initial timeseries of load data as the object is loaded onto the smart hook during a loading period; and calculate an initial prediction of the type of the object based on this pickup location and a loading profile derived from these timeseries load data. The smart hook can then: record timeseries load and motion data during a transfer period as the crane moves the smart hook and the object from the pickup location to a drop-off location; and refine the predicted type of the object based on load and motion characteristics, such as natural frequency of the object, pitching frequency and amplitude of the object, and/or "sloshing" frequency and amplitude of the object. Furthermore, the smart hook can: record its geospatial location and a final timeseries of load data as the object is unloaded onto the smart hook during an unloaded period; and further refine the predicted type of the object based on this drop-off location and an unloading profile derived from these timeseries load data.

13. Computer Vision Model Training with High-Confidence Load Identity

In one variation shown in FIG. 5, the smart hook also captures an image (e.g., a photographic image, a depth image) of the object during the lift event and writes this image to the lift event record. The remote computer system then labels the image with the type of object identified according to loading, motion, and/or geospatial data, as described above, adds this image to a set of training images, and (re)trains an image-based (or "computer vision") model to detect and identify objects based on these training images in Block S180.

For example, following receipt of a lift event record (or a lift event record specifying an object type confidence score exceeding threshold score), the remote computer system can: retrieve an image—captured by the downward-facing camera in the smart hook during the lift event—from the lift event record; detect the object in a region of the image; label the region of the image frame with the type of the object (and the confidence score for the type of object); access a corpus of training images captured at the construction site; append the corpus of training images with the region of the image labeled with the type of the object; and then implement artificial intelligence techniques (e.g., a convolutional neural network, an adversarial neural network) to (re)train an image-based object recognition model for the construction site based on the corpus of training of images.

Later, the smart hook can: download and store a local copy of this image-based object recognition model; detect a new lift event; access a second image captured by the downward-facing camera during this new lift event; detect the second object in a region of the second image; and identify a second type of the second object carried by the crane hook during the new lift event based on features detected in the second region of the second image frame and the image-based object recognition model. Concurrently, the smart hook can implement methods and techniques described above to calculate or predict the identity of the second object based on load, motion, and/or geospatial data collected by the smart hook during this new lift event. Accordingly, the smart hook can: verify the second type of the second object based on this load-, motion-, and/or geospatial-based object type prediction; and then generate a second lift event record defining the second type of the second object, the weight of the second object, a second pickup location of the second object, and/or a second drop-off location of the second object; etc.

Therefore, in this variation, the smart hook and the remote computer system can cooperate to train an image-based object recognition model for a particular construction site (or a particular site manager, crane operator, construction crew, geographic region. etc.) based on non-image-based object identification of objects loaded onto the smart hook over a first period of time and then implement this image-based object recognition model to identify objects loaded onto the crane over a subsequent period of time, such as instead of implementing non-image-based object identification or to validate non-image-based object identification.

14. Unidentified or Low-Confidence Load Identity

In a similar variation in which the smart hook fails to identify a type of an object carried by the smart hook with more than a minimum confidence (or without a clear object type frontrunner), the smart hook (or the remote computer system) can: select an image recorded by the optical sensor while the object is (or was) loaded on the smart hook; extract features in a near-field region of the image; and implement computer vision techniques (e.g., template matching, object recognition) to identify a type of the object based on these extracted features, such as based on the image-based object recognition model described above.

14.1 Manual Identification for Low-Confidence Load Identity

Additionally or alternatively, in this variation, if the smart hook fails to identify a type of an object carried by the smart hook with more than a minimum confidence (or without a clear object type frontrunner) via such image-based and/or non-visual load identification techniques, the smart hook (or the remote computer system) can: select an image recorded by the optical sensor in the smart hook during the lift event; and transmit this image to a human annotator for manual object confirmation or labeling, such as in (near) real-time during the lift event or later following conclusion of the lift event in Block S170, as shown in FIG. 5.

For example, during the lift event, the smart hook can implement methods and techniques described above to: calculate a first similarity score for the object corresponding to a first object type—in a set of object types—based on a lifting profile and a weight of the object, etc. captured during the lift event; calculate a second similarity score for the object corresponding to a second object type—in this set of object types—based on these same object characteristics; and then identify the object as a unit of the first object type in response to the first similarity score exceeding the second similarity score. However, if the first similarity score falls below a threshold score, the remote computer system (and/or the smart hook) can: flag this lift event for manual verification of the type of the object; serve contents of the lift event record to a remote operator portal for manual verification of the type of the object by a human annotator; and then (re)write a type of the object to the lift event record based on a response entered by the human annotator.

In this variation, the remote computer system can also update non-visual load identification models described above based on manual identification of this object supplied by the human annotator. For example, the remote computer system can: access and label timeseries load and motion data—recorded by the smart hook while carrying this object and stored in the lift event—with the type of the object thus identified in the concurrent image or labeled by the human annotator; and then retrain non-visual load identification models based on these new labeled data.

Alternatively, in this variation, if the smart hook fails to identify a type of an object carried by the smart hook with more than a minimum confidence (or without a clear object type frontrunner) during the lift event, the smart hook (or the remote computer system) can execute the foregoing methods and techniques in real-time to serve notifications to personnel at the construction site based on a highest-confidence object type or a current object type frontrunner calculated by the smart hook and mark such notifications as "low-confidence" or "load not verified." If the smart hook fails to identify a type of an object carried by the smart hook with more than a minimum confidence (or without a clear object type frontrunner) upon completion of the lift event, the smart hook can: select a video clip recorded by the optical sensor while the object was loaded on the smart hook; append this video clip to the lift event record; and flag the lift event record for subsequent analysis and load verification by the human annotator.

15. Load Status

While the smart hook carries an object, the smart hook can also identify and broadcast its status to the remote computer system for publication to the manager portal. For example, as the output of the weight sensor indicates that the load carried by the smart hook is increasing at the start of a new lift event, the smart hook can transmit a "loading" status indicator to the remote computer system. Once the output of the weight sensor indicates that the load carried by the smart hook is consistent and sufficiently intransient, and as the altimeter indicates that the altitude of the smart hook is increasing, the smart hook can: store the current payload size read by the weight sensor as a weight of the object in the current lift event record; and transmit this weight and a "loaded, lifting" status indicator to the remote computer system for publication to the manager portal. If the output of the weight sensor indicates that the load carried by the smart hook is sufficiently intransient and greater than the stored tare value and if outputs of the altimeter and geospatial position module are sufficiently intransient, the smart hook can transmit a "loaded, static" status indicator to the remote computer system for publication to the manager portal.

Furthermore, if the output of the weight sensor indicates that the load carried by the smart hook is sufficiently intransient and greater than the stored tare value, if the altimeter indicates that the altitude of the smart hook is sufficiently intransient, and if outputs of the geospatial position module are changing, the smart hook can transmit a "loaded, moving laterally" status indicator to the remote computer system for publication to the manager portal. When the output of the weight sensor indicates that the load carried by the smart hook is sufficiently intransient and greater than the stored tare value and when outputs of the altimeter indicate that the smart hook is decreasing in altitude, the smart hook can transmit a "loaded, lowering" status indicator to the remote computer system for publication to the manager portal. As the output of the weight sensor then indicates that the load carried by the smart hook is decreasing, the smart hook can transmit an "unloading" status indicator to the remote computer system. Finally, when the output of the weight sensor reaches the stored tare value, the smart hook can: close (or "end") the new lift event record; and transmit an "unloaded" status indicator to the remote computer system for publication to the manager portal.

While the output of the weight sensor remains at approximately the stored tare value, the smart hook can return "unloaded, lifting," "unloaded, static," "unloaded, moving laterally," and "unloaded, lowering" status indicators to the remote computer system for publication to the manager portal.

Furthermore, the smart hook can: record timestamps of these status changes; record concurrent geospatial locations and altitudes of the smart hook; generate timestamped, georeferenced status indicators for these status changes; and write these timestamped, georeferenced status indicators to the lift event record.

16. Unique Object Identification

In one variation shown in FIG. 3, the smart hook (and/or the remote computer system) uniquely identifies an object carried by the smart hook during a lift event. For example, the smart hook (or the remote computer system) can process load, motion, and/or geospatial data captured by the smart hook during the lift event to identify this object as a unique instance (or "unit") of a particular object type planned for temporary or permanent installation at the construction site, such as a particular steel girder—in a set of girders— exhibiting a unique set of features (e.g., welded mounting tabs, flange bolt hole patters) or characteristics (e.g., weight, web and flange dimensions, length) and designated for installation at a particular location within the construction site.

16.1 Example: Steal Beam Identification

In one example shown in FIG. 3, once the smart hook (or the remote computer system) identifies an object loaded onto the smart hook during a lift event as a steel beam, the smart hook (or the remote computer system) can also uniquely identify the steel beam—from other steel beams designated for installation at the construction site—based on its length and weight. For example, after identifying the object as a steel beam, the smart hook (or the remote computer system) can: retrieve a list of steel beams designated for installation at the construction site; filter this list of steel beams to remove those previously identified by the smart hook (or by the remote computer system) as unloaded from the crane (and thus installed) near their installation locations designated in the site map or construction plan; and then identify a particular steel beam—remaining in this list—that is labeled with a length and/or a weight nearest the length and weight of the object. The smart hook (or the remote computer system) can thus uniquely identify the object as a particular steel beam, such as before the object is unloaded from the smart hook at a drop-off location, and write a unique identifier of the particular steel beam to the lift event record of the object.

Furthermore, if the smart hook (or the remote computer system) thus uniquely identifies the object as a particular steel beam, the smart hook can: retrieve an assigned install location of the particular steel beam; monitor its trajectory as the crane drives the smart hook and the object toward a drop-off location; record its geospatial location when the object is lowered and unloaded from the smart hook; and verify that this geospatial location falls within a threshold distance of the install location assigned to the particular steel beam. If the smart hook verifies that this geospatial location falls within the threshold distance of the assigned install location, the smart hook can write an install location match for the steel beam to the lift event record. Alternatively, if the object is unloaded from the smart hook at greater than this threshold distance from its assigned install location, the smart hook can: flag the object for a possible installation error; transmit an electronic notification to the crane operator to verify the install location of the object; and transmit an electronic notification to a site manager to inspect and confirm correct installation of the object.

Similarly, the smart hook (or the remote computer system) can: identify a (small) subset of steel beams remaining in the foregoing list that are labeled with lengths and/or weights near the length and weight of the object; associate the object with a small number of possible steel beam identifiers; and write these possible steel beam identifiers to the lift event record for the object, such as before the object is unloaded from the smart hook at a drop-off location. The smart hook can then: record its geospatial location when the object is lowered and unloaded from the smart hook; query the assigned install locations of the subset of steel beams; identify the object as a particular steel beam assigned an install location nearest this geospatial location; and write an identifier for this particular steel beam to the lift event record of the object. Alternatively, if the assigned install locations of each steel beam in this subset falls beyond a threshold distance from this geospatial location at which the object is unloaded from the smart hook, the smart hook (or the remote computer system) can: flag the object for a possible installation error; transmit an electronic notification to the crane operator to verify the install location of the object; and transmit an electronic notification to a site manager to inspect and confirm correct installation of the object.

16.2 Other Examples

In another example, after identifying a type of an object loaded onto the smart hook and after recording a drop-off location of the object, the smart hook (or the remote computer system) retrieves an estimated weight of a target object of the same type designated for installation proximal (e.g., nearest) this drop-off location, such as from a construction plan or construction schedule for the construction site. Then, if the weight of the object differs from the estimated weight of the target object by more than a threshold weight value (e.g., 1%), the smart hook (or the remote computer system) can generate a prompt to confirm of installation proximal the second geospatial location and transmit this prompt to the crane operator. The smart hook (or the remote computer system) can additionally or alternatively generate a prompt to investigate the object and transmit this prompt to the site manager or other site personnel.

17. Other Errors

Similarly, the smart hook and/or the remote computer system can detect material handling and distribution errors at the construction site based on differences between object types, sizes, pickup locations, and/or drop-off locations, etc. and similar characteristics described in a site map or construction schedule and then distribute electronic notifications to personnel at the construction site in Block S160, as shown in FIG. 1.

In another example shown in FIG. 1, the smart hook implements methods and techniques described above to identify the type of an object loaded onto the smart hook based on: a loading of the object duration falling within a template range of loading durations associated with concrete hoppers; a slope of a lifting profile for the object falling within a template range of loading profile slopes associated with concrete hoppers; the weight of the object falling within a template range of weights associated with concrete hoppers; and/or the pitch frequency of the object falling within a template range of sloshing frequencies associated with concrete hoppers. During this lift event, the smart hook continues to track the location, altitude, and weight of the concrete hopper, such as by recording geospatial location and load timeseries data to a lift event record. Upon arrival at a second geospatial location, the smart hook detects reduction in weight of the object, such as to a second weight, based on these timeseries load data. Based on earlier identification of the object as a concrete hopper, the smart hook can: calculate a concrete dispense weight at the second geospatial location based on a difference between the initial weight and the second weight of the object; and then write this concrete dispense weight at the second geospatial location to the lift event record.

Furthermore, in this example, the remote computer system (or the smart hook) can access a target concrete weight allocated to the second geospatial location, such as by extracting this target concrete weight from a specification—stored in a site map or construction schedule for the construction site—for a concrete weight or volume unloading near the second geospatial location. Then, in response to the concrete dispense weight differing from the target concrete weight by more than a threshold difference (e.g., +/−5%), the remote computer system can flag a region of the construction site proximal this second geospatial location for inspection and/or send an electronic notification to the crane operator and/or to the site manager to confirm an overage or underage of concrete near the second geospatial location.

17. Lift Event Record

Block S150 of the method S100 recites generating a lift event record defining the type of the object, the payload size of the object, a pickup location at the first geospatial location, and a drop-off location at the second geospatial location. Generally, in Block S150, the smart hook can aggregate the various data—such as including object type, weight, motion, geospatial location, altitudes, and photographic images collected by the smart hook while an object is loaded on the smart hook—into a lift event record for this object, as shown in FIG. 1.

The smart hook can additionally or alternatively derive lift event metrics from these data and write these metrics to the lift event record. For example, in addition to load type, the smart hook can: identify a staging area where the object was stored based on the geospatial location and altitude of the smart hook when the object was first loaded onto the smart hook (i.e., the pickup location) and a local copy of a site map stored on the smart hook; identify a floor or level number and a wing or region of a building where the load was delivered based on the geospatial location and altitude of the smart hook when the object was unloaded and the site map; calculate an in-air time based on a duration between initial loading and final unloading of the object; calculate a static load time based on a duration of time that the smart hook was not moving laterally or vertically between the initial loading and final unloading of the object; and/or extract peak lateral speeds, peak vertical speeds, and peak height of the smart hook between the initial loading and final unloading of the object. The smart hook can then write these metrics to the lift event record for this object (such as in addition to or in place of raw sensor data recorded during this lift event).

Alternatively, the smart hook can transmit the lift event record for this object—including raw or filtered (e.g., denoised) sensor data—to the remote computer system upon completion of the lift event (e.g., when the output of the weight sensor returns to the stored tare value), and the remote computer system can extract the foregoing metrics from these sensor data. Yet alternatively, the smart hook can stream these sensor data to the remote computer system during the lift event, and the remote computer system can aggregate these data into a lift event record and derive the foregoing metrics and smart hook statuses from these data.

The remote computer system can also update the manager portal to reflect these metrics, such as in real-time during the lift event or upon conclusion of the lift event. The remote computer system can also store lift event records in a remote database; and the manager portal can then retrieve an individual lift event record from the database and render these metrics and other data contained in this lift event record when selected by the site manager or other operator at the manager portal.

18. Object Distribution Update

Furthermore, once the smart hook (or the remote computer system) identifies a type of an object loaded onto the smart hook, the smart hook (or the remote computer system) can update a table, spreadsheet, sitemap, or other electronic document to reflect removal of an object of this type—and of a weight measured by the smart hook—at the geospatial location of the smart hook when loaded with the object. Similarly, once the smart hook (or the remote computer system) determines that the object has been unloaded from the smart hook, the smart hook (or the remote computer system) can update the table, spreadsheet, sitemap, or other electronic document to reflect placement of an object of this type—and of the weight measured by the smart hook—at this geospatial location of the smart hook when the object is unloaded from the smart hook.

19. Lift Event Notifications

In one variation shown in FIGS. 1 and 3, the remote computer system (and/or the smart hook) generates and distributes notifications based on characteristics of objects detected at the smart hook during lift events. For example, after detecting and identifying an object at the smart hook during a lift event, the smart hook (or the remote computer system) can access a set of notification triggers associated with the construction site and scan the set of notification triggers for a particular notification trigger that specifies characteristics (e.g., type, weight, length, pickup location, and/or dropoff location). Then, upon identifying a particular notification trigger, in the set, that specifies such characteristics, the smart hook (or the remote computer system) can generate a notification identifying this lift event (e.g., specifying loading of a unit of a particular object type at the first geospatial location) and then transmit this notification to an account associated with the notification trigger, such as in real-time during the lift event.

19.1 Notification Correction

As described above, the smart hook (and/or the remote computer system) can refine the object type prediction for an object carried by the smart hook as the smart hook captures additional data throughout the lift event and update the lift event record accordingly. Furthermore, if the smart hook (or the remote computer system) corrects its prediction for the type of the object after transmitting a notification based on a previous object type prediction for this object, the smart hook (or the remote computer system) can retract this previous notification and resend a new, corrected notification according to revised object type prediction of the object.

20. Lift Event Replay

In another variation, the remote computer system can reconstruct a virtual animation depicting a lift event occurring at the construction site based on data stored in a lift event record and then package this animation for playback to a user, such as the site manager via the manager portal (or other interface) described above, thereby enabling the user to retroactively and/or remotely visualize and verify progress and events occurring at the remote computer system.

In one example, the smart hook and the remote computer system cooperate to: capture timeseries geospatial locations, motion data, and/or load values during a lift event; write these timeseries data and a predicted type of the object, etc. to the lift event record; and to store this lift event record, such as in a remote database. Upon completion of (or during) the lift event, the remote computer system can retrieve a virtual model of the predicted type of the object, such as from a database of virtual construction object models or from a virtual model of the construction site, including virtual steel beam, concrete formwork, concrete hopper, rebar bundle, precast concrete, and/or sheet good models. The remote computer system can then: scale the virtual model of the type of the object based on the weight of the object; elongate the virtual model based on a predicted length of the object; color or skew the virtual model based on object features extracted from an image of the object recorded by the smart hook during the lift event; and/or project a region of an image depicting the object and recorded during the lift event onto the virtual model of the type of the object in order to realistically color the virtual model.

In this example, the remote computer system can also: derive a virtual three-dimensional path representing the trajectory of the object during the lift event based on a timeseries of geospatial locations stored in the lift event record; define pitching motion animations of the virtual model along the virtual three-dimensional path based on a timeseries of motion data stored in the lift event record; and retrieve a virtual model of the construction site.

Accordingly, the construction site can fuse the virtual model of the object, the virtual three-dimensional path, pitching motion animations of the virtual model, and the virtual model of the construction site into a virtual animation depicting the virtual model traversing the virtual three-dimensional path within the virtual model of the construction site. The remote computer system can then render the virtual animation, such as in a digital video file or short animation file.

The remote computer system can then upload this virtual animation to the manager portal for access by the site manager or transmit this virtual animation to site personnel via other communication channels, such as via a business communication platform or SMS or MMS text message. (The remote computer system can also generate a similar virtual animation depicting a planned flight path—from a planned pickup location to a planned dropoff location—for the particular object or object type during this lift event. The manager portal can then render this virtual animation of the planned flight path for the lift event adjacent the virtual animation of the actual lift event or overlayed over the virtual animation of the actual lift event, thereby enabling the site manager to quickly visually discern deviations from the planned flight path for this lift event.)

However, the remote computer system can generate an animation of a lift event in any other way and can present this animation to the site manager or other site personnel in any other way.

21. Autonomous Cranes

In one variation, rather than transmit notifications and other alerts to a human crane operator, the smart hook (or the remote computer system) transmits alarms and/or prompts to an autonomous crane controller in order to trigger the autonomous crane controller to automatically modify operation of the crane responsive to a motion or location event.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for tracking objects at a construction site comprising:
- accessing a first timeseries of load values output by a weight sensor, coupled to a crane hook operating on the construction site, during a first time period;
- deriving a first lifting profile from the first timeseries of load values;
- identifying a first object type of a first object carried by the crane hook during the first time period based on the first lifting profile;
- accessing a first optical image captured by a downward-facing optical sensor, coupled to the crane hook, during the first time period;
- detecting the first object in a first region of the first optical image;
- labeling the first region of the first optical image with the first object type of the first object;
- appending a corpus of training images with the first region of the first optical image labeled with the first object type of the first object; and
- training an object recognition model based on the corpus of training of images.

2. The method of claim 1, further comprising:
- accessing a second optical image captured by the downward-facing optical sensor during a second time period succeeding the first time period;
- detecting a second object in a second region of the second optical image;
- extracting a set of features from the second region of the second optical image; and
- identifying a second object type of the second object based on the set of features and the object recognition model.

3. The method of claim 2:
- further comprising
  - accessing a second timeseries of load values output by the weight sensor during the second time period; and
  - deriving a second lifting profile from the second timeseries of load values; and
- wherein identifying the second object type of the second object based on the set of features and the object recognition model comprises identifying the second object type of the second object based on the set of features, extracted from the second region of the second optical image, and the object recognition model in response to failure to identify the second object type of the second object based on the second lifting profile.

4. The method of claim 2, further comprising:
- accessing a first geospatial location of the crane hook during loading of the first object onto the crane hook during the first time period;
- deriving a first weight of the first object based on the first timeseries of load values;
- accessing a second geospatial location of the crane hook during unloading of the first object from the crane hook;
- generating a first lift event record defining the first object type of the first object, the first weight of the first object, a first pickup location of the first object at the first geospatial location, and a first drop-off location of the first object at the second geospatial location;
- accessing a third geospatial location of the crane hook during loading of the second object onto the crane hook during the second time period;
- deriving a second weight of the first object based on a load value output by the weight sensor during the second time period;
- accessing a fourth geospatial location of the crane hook during unloading of the second object from the crane hook; and
- generating a second lift event record defining the second object type of the second object, the second weight of the second object, a second pickup location of the second object at the third geospatial location, and a second drop-off location of the second object at the fourth geospatial location.

5. The method of claim 1:
- wherein accessing the first optical image comprises accessing the first optical image captured by the downward-facing optical sensor in response to detected increase in load carried by the crane hook based on the first timeseries of load values; and
- wherein detecting the first object in the first region of the first optical image comprises detecting the first object in a first near-field region of the first optical image.

6. The method of claim 1:
- wherein appending the corpus of training images comprises appending the corpus of training images, containing regions of images captured by a downward-facing optical sensor arranged on a set of crane hooks operating within the construction site, with the first region of the first optical image labeled with the first object type of the first object;
- wherein training the object recognition model comprises training the object recognition model, specific to the construction site, based on the corpus of training of images; and
- further comprising:
  - accessing a second optical image captured by the downward-facing optical sensor, at the construction site, during a second time period succeeding the first time period;
  - detecting a second object in a second region of the second optical image;
  - extracting a set of features from the second region of the second optical image; and
  - based on capture of the second optical image at the construction site:
    - selecting the object recognition model; and
    - identifying a second object type of the second object based on the second set of features and the object recognition model.

7. The method of claim 1:
- further comprising:
  - accessing a first geospatial location of the crane hook during loading of the first object onto the crane hook during the first time period;
  - accessing a second geospatial location of the crane hook during unloading of the first object from the crane hook; and
  - associating the first object type of the first object, the first geospatial location, and the second geospatial location; and
- wherein training the object recognition model comprises training the object recognition model to identify object types of objects carried by the crane hook at the construction site based on:
  - features detected in optical images captured by the downward-facing optical sensor;
  - geospatial locations of the crane hook during object loading onto the crane hook; and geospatial locations of the crane hook during object unloading from the crane hook.

8. The method of claim 7, further comprising:
accessing a second optical image captured by the downward-facing optical sensor during a second time period succeeding the first time period;
accessing a third geospatial location of the crane hook during loading of the second object onto the crane hook during the second time period;
accessing a fourth geospatial location of the crane hook during unloading of the second object from the crane hook;
detecting a second object in a second region of the second optical image;
extracting a set of features from the second region of the second optical image; and
identifying a second object type of the second object based on the second set of features, the third geospatial location, the fourth geospatial location, and the object recognition model.

9. The method of claim 1:
further comprising:
accessing a second timeseries of motion values, output by a motion sensor coupled to the crane hook, during the first time period; and
deriving a first oscillation characteristic of the crane hook during the first time period based on the second timeseries of motion values; and
wherein identifying the first type of the first object comprises identifying the first type of the first object further based on the first oscillation characteristic.

10. The method of claim 9:
further comprising:
associating the first oscillation characteristic with the first object type;
wherein training the object recognition model comprises training the object recognition model to identify object types of objects carried by the crane hook at the construction site based on:
features detected in optical images captured by the downward-facing optical sensor; and
oscillation characteristics of the crane hook; and
further comprising:
accessing a second optical image captured by the downward-facing optical sensor during a second time period succeeding the first time period;
accessing a third timeseries of motion values, output by the motion sensor, during the second time period;
deriving a second oscillation characteristic of the crane hook during the second time period based on the third timeseries of motion values; and
detecting a second object in a second region of the second optical image;
extracting a set of features from the second region of the second optical image; and
identifying a second object type of the second object based on the second set of features, the second oscillation characteristic, and the object recognition model.

11. A method for tracking objects at a construction site comprising:
accessing a first timeseries of motion values output by a motion sensor, coupled to a crane hook operating on the construction site, during a first time period;
deriving a first oscillation characteristic of the crane hook during the first time period based on the first timeseries of motion values;

identifying a first object type of a first object carried by the crane hook during the first time period based on the first oscillation characteristic;
accessing a first optical image captured by a downward-facing optical sensor, coupled to the crane hook, during the first time period;
detecting the first object in a first region of the first optical image;
labeling the first region of the first optical image with the first object type of the first object;
appending a corpus of training images with the first region of the first optical image labeled with the first object type of the first object; and
training an object recognition model based on the corpus of training of images.

12. The method of claim 11, further comprising:
accessing a second optical image captured by the downward-facing optical sensor during a second time period succeeding the first time period;
detecting a second object in a second region of the second optical image;
extracting a set of features from the second region of the second optical image; and
identifying a second object type of the second object based on the second set of features and the object recognition model.

13. The method of claim 12:
further comprising
accessing a second timeseries of motion values output by the weight sensor during the second time period; and
deriving a second oscillation characteristic of the crane hook from the second timeseries of load values; and
wherein identifying the second object type of the second object based on the set of features and the object recognition model comprises identifying the second object type of the second object based on the set of features, extracted from the second region of the second optical image, and the object recognition model in response to failure to identify the second object type of the second object based on the second oscillation characteristic of the crane hook.

14. The method of claim 11:
wherein appending the corpus of training images comprises appending the corpus of training images, containing regions of images captured by a downward-facing optical sensors arranged on a set of crane hooks operating within the construction site, with the first region of the first optical image labeled with the first object type of the first object;
wherein training the object recognition model comprises training the object recognition model, specific to the construction site, based on the corpus of training of images; and
further comprising:
accessing a second optical image captured by the downward-facing optical sensor, at the construction site, during a second time period succeeding the first time period;
detecting a second object in a second region of the second optical image;
extracting a set of features from the second region of the second optical image; and based on capture of the second optical image at the construction site:
  selecting the object recognition model; and
  identifying a second object type of the second object based on the second set of features and the object recognition model.

15. The method of claim 11:
wherein deriving the first lifting profile comprises deriving the first lifting profile, representing transition of the weight of the first object onto the crane hook during a loading duration within the first time period, from the first timeseries of load values;
wherein deriving the first oscillation characteristic from the second timeseries of motion values comprises deriving a pitch frequency of the first object from the second timeseries of motion values; and
wherein identifying the first type of the first object comprises identifying the first object as a concrete hopper based on:
  the first loading duration falling within a template range of loading durations associated with concrete hoppers; and
  the pitch frequency falling within a template range of sloshing frequencies associated with concrete hoppers.

16. The method of claim 11:
wherein deriving the first oscillation characteristic from the second timeseries of motion values comprises deriving a pitch frequency of the first object from the second timeseries of motion values;
further comprising:
  accessing a second timeseries of load values output by the weight sensor during the second time period; and
  deriving a natural frequency of the first object from the second timeseries of load values; and
wherein identifying the first type of the first object comprises:
  identifying the first object as elongated in response to the pitch frequency falling below a threshold frequency; and
  in response to identifying the first object as elongated:
    identifying the first object as rebar in response to the natural frequency falling below a threshold frequency; and
    identifying the first object as a steel beam in response to the natural frequency exceeding the threshold frequency.

17. The method of claim 11:
wherein deriving the first oscillation characteristic from the second timeseries of motion values comprises deriving a pitch frequency of the first object from the second timeseries of motion values;
further comprising:
  accessing a second timeseries of load values output by the weight sensor during the second time period; and
  deriving a natural frequency of the first object from the second timeseries of load values; and
wherein identifying the first type of the first object comprises:
  calculating a set of pitch frequency similarity scores for the first object, each pitch frequency similarity score in the set of pitch frequency similarity scores representing proximity of the pitch frequency of the first object to a pitch frequency range of an object type in a set of object types;
  calculating a set of natural frequency similarity scores for the first object, each natural frequency similarity score in the set of natural frequency similarity scores representing proximity of the natural frequency of the first object to a natural frequency range of an object type in the set of object types; and
  identifying the first object as a unit of the first object type based on a combination of the set of pitch frequency similarity scores and the set of natural frequency similarity scores.

18. A method for tracking objects at a construction site comprising:
  accessing a first geospatial location of a crane hook, operating on the construction site, during loading of a first object onto the crane hook during a first time period;
  accessing a second geospatial location of the crane hook during unloading of the first object from the crane hook during the time period;
  accessing a first optical image captured by a downward-facing optical sensor, coupled to the crane hook, during the first time period;
  detecting the first object in a first region of the first optical image;
  extracting a first set of features from the first region of the first optical image; and
  accessing an object recognition model trained on optical images of objects of known object types transferred between known geospatial locations on the construction site by the crane hook prior to the first time period; and
  identifying a first object type of the first object based on the first set of features, the first geospatial location, the second geospatial location, and the object recognition model.

19. The method of claim 18, further comprising:
  accessing a timeseries of load values output by a weight sensor, coupled to the crane hook, during a second time period preceding the first time period;
  accessing a third geospatial location of the crane hook during loading of the second object onto the crane hook during the second time period;
  accessing a fourth geospatial location of the crane hook during unloading of the second object from the crane hook;
  deriving a lifting profile from the timeseries of load values;
  identifying a second object type of a second object carried by the crane hook during the second time period based on the lifting profile;
  associating the second object type of the second object, the third geospatial location, and the fourth geospatial location;
  accessing a second optical image captured by the downward-facing optical sensor during the second time period;
  detecting the second object in a second region of the second optical image;
  labeling the second region of the second optical image with the second object type of the second object;
  appending a corpus of training images with the second region of the second optical image labeled with the second object type of the second object; and
  training the object recognition model to identify object types of objects carried by the crane hook at the construction site based on the corpus of training of images, the corpus of training of images comprising:
    features detected in optical images captured by the downward-facing optical sensor;

geospatial locations of the crane hook during object loading onto the crane hook; and
geospatial locations of the crane hook during object unloading from the crane hook.

20. The method of claim 18, further comprising:
accessing a timeseries of motion values output by a motion sensor, coupled to the crane hook, during a second time period preceding the first time period;
accessing a third geospatial location of the crane hook during loading of the second object onto the crane hook during the second time period;
accessing a fourth geospatial location of the crane hook during unloading of the second object from the crane hook;
deriving an oscillation characteristic of the crane hook from the timeseries of motion values;
identifying a second object type of a second object carried by the crane hook during the second time period based on the oscillation characteristic;
associating the second object type of the second object, the third geospatial location, and the fourth geospatial location;
accessing a second optical image captured by the downward-facing optical sensor during the second time period;
detecting the second object in a second region of the second optical image;
labeling the second region of the second optical image with the second object type of the second object;
appending a corpus of training images with the second region of the second optical image labeled with the second object type of the second object; and
training the object recognition model to identify object types of objects carried by the crane hook at the construction site based on the corpus of training of images, the corpus of training of images comprising:
features detected in optical images captured by the downward-facing optical sensor;
geospatial locations of the crane hook during object loading onto the crane hook; and
geospatial locations of the crane hook during object unloading from the crane hook.

* * * * *